United States Patent
Yang

(10) Patent No.: US 9,035,524 B2
(45) Date of Patent: May 19, 2015

(54) SWITCH TYPE DC BRUSHLESS ELECTRIC MACHINE HAVING AUXILIARY EXCITATION WINDING SET

(76) Inventor: Tai-Her Yang, Dzan-Hwa (TW)

( * ) Notice: Subject to any disclaimer, the term of this patent is extended or adjusted under 35 U.S.C. 154(b) by 368 days.

(21) Appl. No.: 13/493,126

(22) Filed: Jun. 11, 2012

(65) Prior Publication Data
US 2013/0328434 A1    Dec. 12, 2013

(51) Int. Cl.
*H02K 21/04* (2006.01)
*H02P 7/06* (2006.01)

(52) U.S. Cl.
CPC .............. *H02K 21/042* (2013.01); *H02P 7/06* (2013.01)

(58) Field of Classification Search
CPC ................................ H02K 21/042; H02P 7/06
USPC .................................................. 310/180, 181
See application file for complete search history.

(56) References Cited

U.S. PATENT DOCUMENTS

| | | | | |
|---|---|---|---|---|
| 1,646,821 A | * | 10/1927 | Karapetoff | 322/19 |
| 2,437,996 A | * | 3/1948 | Carnegie et al. | 318/758 |
| 2,977,518 A | * | 3/1961 | Kafka et al. | 318/400.17 |
| 3,675,099 A | * | 7/1972 | Johnston | 318/762 |
| 3,750,000 A | * | 7/1973 | Bruckner et al. | 318/696 |
| 4,260,944 A | * | 4/1981 | O'Mahony | 322/48 |
| 4,412,794 A | * | 11/1983 | Presley | 418/61.1 |
| 4,532,458 A | * | 7/1985 | Kuznetsov et al. | 318/111 |
| 4,786,853 A | * | 11/1988 | VanMaaren | 322/75 |
| 5,179,308 A | * | 1/1993 | Malsky | 310/90.5 |
| 6,373,204 B1 | * | 4/2002 | Peterson et al. | 318/41 |
| 7,250,734 B1 | * | 7/2007 | Iannello et al. | 318/254.1 |
| 7,859,200 B2 | * | 12/2010 | Yang | 318/34 |
| 7,915,778 B2 | * | 3/2011 | Miyata et al. | 310/180 |
| 2002/0117934 A1 | * | 8/2002 | Kanazawa et al. | 310/263 |
| 2002/0117935 A1 | * | 8/2002 | Kanazawa et al. | 310/263 |
| 2010/0019701 A1 | * | 1/2010 | Yang | 318/49 |
| 2010/0148717 A1 | * | 6/2010 | Yang | 318/767 |

* cited by examiner

*Primary Examiner* — Alex W Mok
(74) *Attorney, Agent, or Firm* — Bacon & Thomas, PLLC

(57) ABSTRACT

The present invention provides an auxiliary excitation winding set to be installed at the rotary part of the electric machine (104) composed of a rotary part of the permanent magnetic electric machine or a rotary part of the reluctance electric machine of the switched DC brushless electric machine (1000), and an electric conductive annular brush device (107) is served as an interface for transmitting the electric power, thereby inputting the excitation electric power to the auxiliary excitation winding set; and through controlling the value and the polarity of excitation voltage and current, the magnetic pole of the rotary part of magnet-motive electric machine (104) of the switched DC brushless electric machine (1000) can be performed with the excitation effect of auxiliary excitation or differential excitation or auxiliary compound excitation or differential compound excitation.

5 Claims, 2 Drawing Sheets

SWITCH TYPE DC BRUSHLESS ELECTRIC MACHINE HAVING AUXILIARY EXCITATION WINDING SET

BACKGROUND OF THE INVENTION (a) Field of the Invention

The present invention provides a switched DC brushless electric machine having excitation winding set in which a rotary part of electric machine (104) composed of a rotary part of permanent magnetic electric machine or a rotary part of reluctance electric machine of the switched DC brushless electric machine (1000) is installed with a serial type auxiliary excitation winding set (105) and/or a parallel type auxiliary excitation winding set (108), and an electric conductive annular brush device (107) is served as an interface for transmitting the electric power; a drive control device (103) is used for controlling the value and the polarity and the phase sequence of excitation current of a magnetic field winding set of electric machine (102), and also equipped with one or more than one of following functions, including: (A) controlling the value and the polarity of excitation voltage and current of the serial type auxiliary excitation winding set (105); (B) controlling the value and the polarity of excitation voltage and current of the parallel type auxiliary excitation winding set (108); (C) controlling the value and the polarity of excitation voltage and current of both or one of the serial type auxiliary excitation winding set (105) and/or the parallel type auxiliary excitation winding set (108);

With the control function provided by the mentioned drive control device (103), when the switched DC brushless electric machine (1000) is operated as a motor or a power generator, the magnetic pole of the rotary part of electric machine (104) of the switched DC brushless electric machine (1000) can be performed with the excitation effect of auxiliary excitation through serial excitation or differential excitation through shunt excitation, or the excitation effect of auxiliary compound excitation or differential compound excitation.

(b) Description of the Prior Art

In a conventional permanent magnetic or reluctance switched DC brushless electric machine, the permanent magnetic or reluctance electric-mechanical unit of the electric machine is not equipped with a function of altering the characteristic along with the loaded current, therefore the application is limited.

SUMMARY OF THE INVENTION

The present invention provides an auxiliary excitation winding set to be installed at the rotary part of the electric machine (104) composed of a rotary part of the permanent magnetic electric machine or a rotary part of the reluctance electric machine of the switched DC brushless electric machine (1000), and an electric conductive annular brush device (107) is served as an interface for transmitting the electric power, thereby inputting the excitation electric power to the auxiliary excitation winding set; and through controlling the value and the polarity of excitation voltage and current, the magnetic pole of the rotary part of magnet-motive electric machine (104) of the switched DC brushless electric machine (1000) can be performed with the excitation effect of auxiliary excitation or differential excitation or auxiliary compound excitation or differential compound excitation.

DESCRIPTION OF MAIN COMPONENT SYMBOLS

Figure 1:
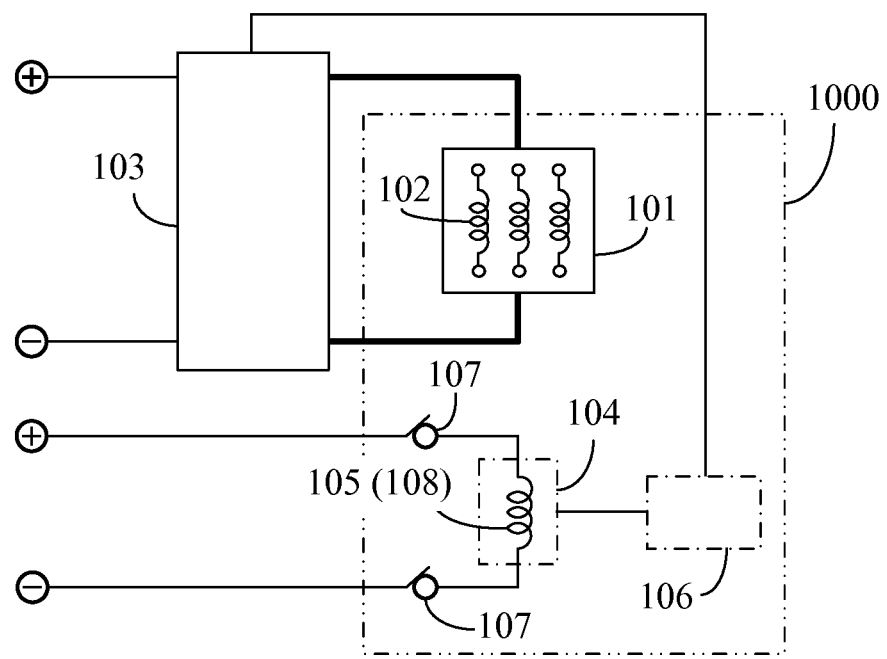
FIG. 1 is a schematic view showing the main electric circuit layout of the switched DC brushless electric machine (1000) having auxiliary excitation winding set, according to the present invention.

101: Magnetic field structure of electric machine
102: Magnetic field winding set of electric machine
103: Drive control device
104: Rotary part of electric machine
105: Serial type auxiliary excitation winding set
106: Electric machine angular position sensor
107: Electric conductive annular brush device
108: Parallel type auxiliary excitation winding set
1000: Switched DC brushless electric machine

DETAILED DESCRIPTION OF THE PREFERRED EMBODIMENTS

In a conventional permanent magnetic or reluctance switched DC brushless electric machine, the permanent magnetic or reluctance electric-mechanical unit of the electric machine is not equipped with a function of altering the characteristic along with the loaded current, therefore the application is limited.

The present invention provides an auxiliary excitation winding set to be installed at the rotary part of the electric machine (104) composed of a rotary part of the permanent magnetic electric machine or a rotary part of the reluctance electric machine of the switched DC brushless electric machine (1000), and an electric conductive annular brush device (107) is served as an interface for transmitting the electric power, thereby inputting the excitation electric power to the auxiliary excitation winding set; and through controlling the value and the polarity of excitation voltage and current, the magnetic pole of the rotary part of magnet-motive electric machine (104) of the switched DC brushless electric machine (1000) can be performed with the excitation effect of auxiliary excitation or differential excitation or auxiliary compound excitation or differential compound excitation;

The present invention provides a switched DC brushless electric machine having excitation winding set in which a rotary part of electric machine (104) composed of a rotary part of permanent magnetic electric machine or a rotary part of reluctance electric machine of the switched DC brushless electric machine (1000) is installed with a serial type auxiliary excitation winding set (105) and/or a parallel type auxiliary excitation winding set (108), and an electric conductive annular brush device (107) is served as an interface for transmitting the electric power; a drive control device (103) is used for controlling the value and the polarity and the phase sequence of excitation current of a magnetic field winding set of electric machine (102), and also equipped with one or more than one of following functions, including: (A) controlling the value and the polarity of excitation voltage and current of the serial type auxiliary excitation winding set (105); (B)

controlling the value and the polarity of excitation voltage and current of the parallel type auxiliary excitation winding set (108); (C) controlling the value and the polarity of excitation voltage and current of both or one of the serial type auxiliary excitation winding set (105) and/or the parallel type auxiliary excitation winding set (108);

With the control function provided by the mentioned drive control device (103), when the switched DC brushless electric machine (1000) is operated as a motor or a power generator, the magnetic pole of the rotary part of electric machine (104) of the switched DC brushless electric machine (1000) can be performed with the excitation effect of auxiliary excitation through serial excitation or differential excitation through shunt excitation, or the excitation effect of auxiliary compound excitation or differential compound excitation.

Figure 2:
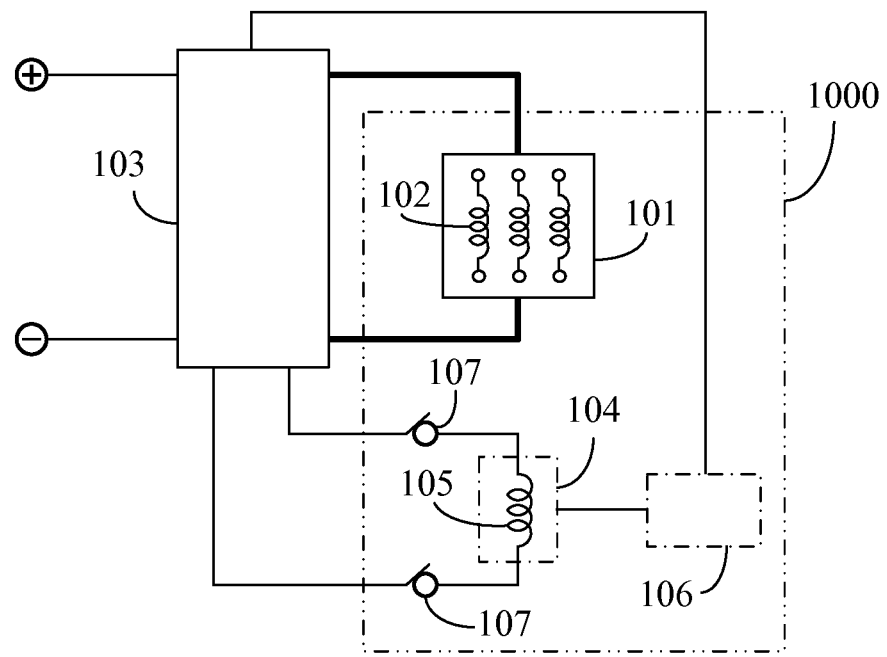
FIG. 2 is a schematic view showing the electric circuit layout of the switched DC brushless electric machine (1000) being installed with a serial type auxiliary excitation winding set (105), according to the present invention.
Figure 3:
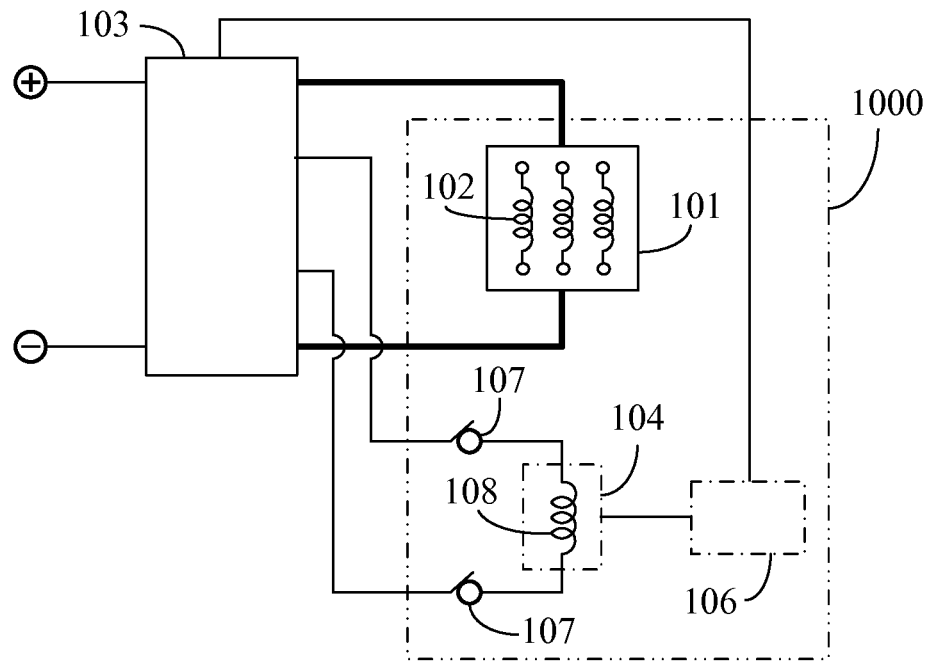
FIG. 3 is a schematic view showing the electric circuit layout of the switched DC brushless electric machine (1000) being installed with a parallel type auxiliary excitation winding set (108), according to the present invention.
Figure 4:
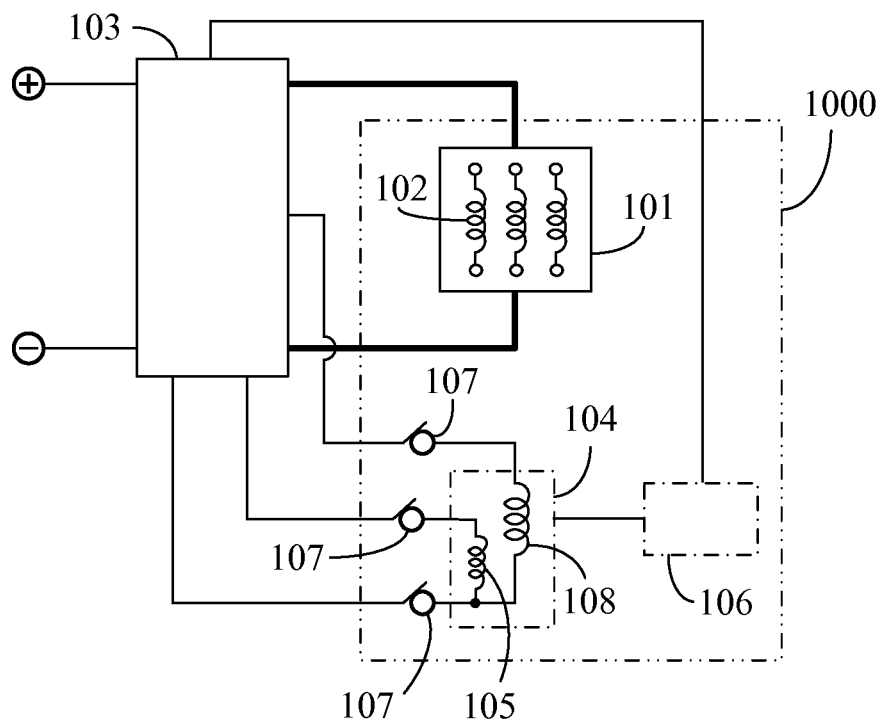
FIG. 4 is a schematic view showing the electric circuit layout of the switched DC brushless electric machine (1000) being installed with the serial type auxiliary excitation winding set (105) and the parallel type auxiliary excitation winding set (108), according to the present invention.

FIG. 1 is a schematic view showing the main electric circuit layout of the switched DC brushless electric machine (1000) having auxiliary excitation winding set, according to the present invention;

As shown in FIG. 1, it mainly consists of:
- drive control device (103): constituted by a drive electric control device composed of electromechanical components and/or solid sate components and/or microprocessors, served to receive signals from the electric machine angular position sensor (106), for controlling the timing, the polarity, the phase sequence and the value of voltage and current of the power supply excitation while the magnetic field winding set of electric machine (102) being operated as a motor, or controlling the timing, the polarity, the phase sequence and the value of voltage and current of outputting electric power while being operated as a power generator; and controlling the voltage, the current and the polarity of excitation electric power passing the serial type auxiliary excitation winding set (105) and/or parallel type auxiliary excitation winding set (108);
- magnetic field structure of electric machine (101): constituted by magnetic conductive iron cores and installed with the magnetic field winding set of electric machine (102) having two or more phases, coupled to the rotary part of electric machine (104), the magnetic loop formed by the magnetic field structure of electric machine (101) and the rotary part of electric machine (104) allows the shifting magnetic field of the field winding set of electric machine (102) to pass, thereby generating the electromechanical effect between the magnetic field structure of electric machine (101) and the rotary part of electric machine (104);
- magnetic field winding set of electric machine (102): constituted by a winding set installed in the magnetic field structure of electric machine (101) having two or more phases; controlled by the excitation control of the drive control device (103) while being operated as a motor, thereby generating magnetic fields with opposite shifting directions, and generating a motor actuation effect with the rotary part of electric machine (104); while being operated as a power generator, the magnetic field winding set of electric machine (102) is controlled by the drive control device (103) thereby controlling the voltage and current of outputting electric power;
- angular position sensor of electric machine (106): constituted by an electromechanical type switch, a Hall element or a physical location sensor such as photoelectron or electromagnetic induction, or ultrasonic or electrostatic induction; installed between the magnetic field structure of electric machine (101) and the rotary part of electric machine (104) which relatively revolve, thereby sensing the relative location relation between the shifting magnetic field generated by the magnetic field winding set of electric machine (102) of the magnetic field structure of electric machine (101) and the rotary part of electric machine (104), and sending the sensing signals to the drive control device (103);
- rotary part of electric machine (104): constituted by magnetic conductive materials, and installed with a rotation shaft and a housing, the characteristic is being coupled at a lateral side of the magnetic field structure of electric machine (101), provided with a salient pole structure having magnetic conductive feature and having the magnetic poles with the quantity same as or different from that of the magnetic field structure of electric machine (101), or having permanent magnetic pole and having the magnetic poles with the quantity same as or different from that of the magnetic field structure of electric machine (101), the characteristic is that the magnetic pole of the rotary part of electric machine (104) being installed with the auxiliary excitation winding set thereby transmitting the excitation electric power between the mentioned winding set and the exterior through the electric conductive annular brush device (107);
- auxiliary excitation winding set: constituted by conductive wires wound on the magnetic pole of the rotary part of electric machine (104), and transmitting the electric power between the mentioned winding set and the exterior through the electric conductive annular brush device (107), the installation means include installing one or both of the serial type auxiliary excitation winding set (105) and the parallel type auxiliary excitation winding set (108), wherein the serial type auxiliary excitation winding set (105) is through the electric conductive annular brush device (107) for being connected in series with the electric power input end of the drive control device (103) having its output end served to drive and control the magnetic field winding set of electric machine (102) then leaded to the DC power source; the parallel type auxiliary excitation winding set (108) is connected in parallel with the DC power source or the output end of the drive control device (103) or two ends of the magnetic field winding set of electric machine (102);
- electric conductive annular brush device (107): constituted by the electric conductive ring and the electric conductive brush, served for respectively installed between the revolving rotary part of electric machine and the exterior, so while the rotary part revolving, the electric power is enabled to be transmitted between the serial type auxiliary excitation winding set (105) and/or the parallel type auxiliary excitation winding set (108) and the exterior;

With the housing, the bearing or locking screws, the switched DC brushless electric machine (1000) can be assembled by the mentioned components, wherein the drive control device (103) can be co-structured with the switched DC brushless electric machine (1000) or separately provided;

FIG. 2 is a schematic view showing the electric circuit layout of the switched DC brushless electric machine (1000) being installed with a serial type auxiliary excitation winding set (105), according to the present invention;

As shown in FIG. 2, the electric circuit layout is as followings:

As shown in FIG. 2, the serial type auxiliary excitation winding set (105) is wound on the magnetic pole of the rotary part of electric machine (104), through the electric conductive annular brush device (107) for being connected in series with the electric power input end of the drive control device (103) having its output end served to drive and control the magnetic field winding set of electric machine (102) then leaded to the DC power source, wherein the excitation polarity thereof and the magnetic pole of the rotary part include the auxiliary excitation with same polarity or the differential excitation with different polarities;

FIG. 3 is a schematic view showing the electric circuit layout of the switched DC brushless electric machine (1000) being installed with a parallel type auxiliary excitation winding set (108), according to the present invention;

As shown in FIG. 3, the electric circuit layout is as followings:

As shown in FIG. 3, the parallel type auxiliary excitation winding set (108) is wound on the magnetic pole of the rotary part of electric machine (104), and through the electric conductive annular brush device (107) for being connected in parallel with the power end of the drive control device (103); moreover, capable of being connected in parallel with the output end after being controlled by the drive control device (103), thereby enabling the polarity, the excitation voltage and current to be individually controlled by the drive control device (103), wherein the excitation polarity thereof and the magnetic pole of the rotary part include the auxiliary excitation with same polarity or the differential excitation with different polarities;

FIG. 4 is a schematic view showing the electric circuit layout of the switched DC brushless electric machine (1000) being installed with the serial type auxiliary excitation winding set (105) and the parallel type auxiliary excitation winding set (108), according to the present invention;

As shown in FIG. 4, the electric circuit layout is as followings:

As shown in FIG. 4
 the serial type auxiliary excitation winding set (105) is wound on the magnetic pole of the rotary part of electric machine (104), through the electric conductive annular brush device (107) for being connected in series with the electric power input end of the drive control device (103) having its output end served to drive and control the magnetic field winding set of electric machine (102) then leaded to the DC power source, wherein the excitation polarity thereof and the magnetic pole of the rotary part include the auxiliary excitation with same polarity or the differential excitation with different polarities;
 the parallel type auxiliary excitation winding set (108) is wound on the magnetic pole of the rotary part of electric machine (104), and through the electric conductive annular brush device (107) for being connected in parallel with the power end of the drive control device (103); moreover, capable of being connected in parallel with the output end after being controlled by the drive control device (103), thereby enabling the polarity, the excitation voltage and current to be individually controlled by the drive control device (103), wherein the excitation polarity thereof and the magnetic pole of the rotary part include the auxiliary excitation with same polarity or the differential excitation with different polarities;

The negative terminal of the parallel type auxiliary excitation winding set (108) and the negative terminal of the serial type auxiliary excitation winding set (105) can be jointly connected thereby forming a long compound excitation connection, or the negative terminal of the parallel type auxiliary excitation winding set (108) is connected with the positive terminal of the serial type auxiliary excitation winding set (105) thereby forming a short compound excitation connection, the excitation polarity of the magnetic pole of the rotary part include the auxiliary excitation with same polarity or the differential excitation with different polarities.

The invention claimed is:

1. A switch type DC brushless electric machine having auxiliary excitation winding set, which provides a switched DC brushless electric machine having an excitation winding set in which a rotary part (104) of the electric machine composed of a rotary part of permanent magnetic electric machine or a rotary part of reluctance electric machine of the switched DC brushless electric machine (1000) is installed with a serial type auxiliary excitation winding set (105) and/or a parallel type auxiliary excitation winding set (108), and an electric conductive annular brush device (107) served as an interface for transmitting the electric power; a drive control device (103) is used for controlling the value and the polarity and the phase sequence of excitation current of a magnetic field winding set (102) of the electric machine, and also equipped with one or more than one of following functions, including: (A) controlling the value and the polarity of excitation voltage and current of the serial type auxiliary excitation winding set (105); (B) controlling the value and the polarity of excitation voltage and current of the parallel type auxiliary excitation winding set (108); (C) controlling the value and the polarity of excitation voltage and current of both or one of the serial type auxiliary excitation winding set (105) and/or the parallel type auxiliary excitation winding set (108);
 wherein with the control function provided by the mentioned drive control device (103), when the switched DC brushless electric machine (1000) is operated as a motor or a power generator, the magnetic pole of the rotary part (104) of electric machine of the switched DC brushless electric machine (1000) can be performed with the excitation effect of auxiliary excitation through serial excitation or differential excitation through shunt excitation, or the excitation effect of auxiliary compound excitation or differential compound excitation; wherein it mainly consists of:
 the drive control device (103): constituted by a drive electric control device that served to receive signals from the electric machine angular position sensor (106), for controlling the timing, the polarity, the phase sequence and the value of voltage and current of the power supply excitation while the magnetic field winding set (102) of the electric machine being operated as a motor, or controlling the timing, the polarity, the phase sequence and the value of voltage and current of outputting electric power while being operated as a power generator; and controlling the voltage, the current and the polarity of excitation electric power passing the serial type auxiliary excitation winding set (105) and/or parallel type auxiliary excitation winding set (108);
 a magnetic field structure (101) of the electric machine: installed with the magnetic field winding set (102) of the electric machine having two or more phases, coupled to the rotary part (104) of electric machine , the magnetic loop formed by the magnetic field structure (101) of electric machine and the rotary part (104) of the electric machine allows the shifting magnetic field of the field winding set (102) of the electric machine to pass, thereby generating the electromechanical effect between the magnetic field structure of electric machine (101) and the rotary part (104) of the electric machine;
 the magnetic field winding set (102) of electric machine: constituted by a winding set installed in the magnetic field structure (101) of the electric machine having two or more phases; controlled by the excitation control of the drive control device (103) while being operated as a motor, thereby generating magnetic fields with opposite shifting directions, and generating a motor actuation effect with the rotary part (104) of the electric machine; while being operated as a power generator, the magnetic field winding set (102) of the electric machine is controlled by the drive control device (103) thereby controlling the voltage and current of outputting electric power;

an angular position sensor of electric machine (106): installed between the magnetic field structure (101) of the electric machine and the rotary part of electric machine (104) which relatively revolve, thereby sensing the relative location relation between the shifting magnetic field generated by the magnetic field winding set (102) of the electric machine of the magnetic field structure of electric machine (101) and the rotary part (104) of the electric machine, and sending the sensing signals to the drive control device (103);

the rotary part (104) of electric machine: constituted by magnetic conductive materials, and being coupled at a lateral side of the magnetic field structure (101) of the electric machine, and provided with a salient pole structure having magnetic poles with the quantity same as or different from that of the magnetic field structure (101) of the electric machine, or having permanent magnetic pole and having the magnetic poles with the quantity same or different from that of the magnetic field structure (101) of the electric machine, the magnetic pole of the rotary part (104) of the electric machine being installed with the auxiliary excitation winding set thereby transmitting the excitation electric power between the mentioned winding set and the exterior through the electric conductive annular brush device (107);

the auxiliary excitation winding set: wound on the magnetic pole of the rotary part (104) of electric machine, and transmitting the electric power between the mentioned winding set and the exterior through the electric conductive annular brush device (107), the installation means include installing one or both of the serial type auxiliary excitation winding set (105) and the parallel type auxiliary excitation winding set (108), wherein the serial type auxiliary excitation winding set (105) is through the electric conductive annular brush device (107) for being connected in series with the electric power input end of the drive control device (103) having its output end served to drive and control the magnetic field winding set (102) of electric machine then leaded to the DC power source; the parallel type auxiliary excitation winding set (108) is connected in parallel with the DC power source or the output end of the drive control device (103) or two ends of the magnetic field winding set (102) of electric machine;

the electric conductive annular brush device (107): respectively installed between the revolving rotary part of electric machine and the exterior, so while the rotary part revolving, the electric power is enabled to be transmitted between the serial type auxiliary excitation winding set (105) and/or the parallel type auxiliary excitation winding set (108) and the exterior;

wherein the switched DC brushless electric machine (1000) can be assembled by the mentioned components, wherein the drive control device (103) can be co-structured with the switched DC brushless electric machine (1000) or separately provided.

2. A switch type DC brushless electric machine having an auxiliary excitation winding set as claimed in claim 1, wherein the electric circuit layout of the switched DC brushless electric machine (1000) is installed with a serial type auxiliary excitation winding set (105) as follows:

the serial type auxiliary excitation winding set (105) is wound on the magnetic pole of the rotary part (104) of the electric machine, through the electric conductive annular brush device (107) for being connected in series with the electric power input end of the drive control device (103) having its output end served to drive and control the magnetic field winding set (102) of the electric machine then leaded to the DC power source, wherein the excitation polarity thereof and the magnetic pole of the rotary part include the auxiliary excitation with same polarity or the differential excitation with different polarities.

3. A switch type DC brushless electric machine having an auxiliary excitation winding set as claimed in claim 1, wherein the electric circuit layout of the switched DC brushless electric machine (1000) is installed with a parallel type auxiliary excitation winding set (108) as follows:

the parallel type auxiliary excitation winding set (108) is wound on the magnetic pole of the rotary part (104) of the electric machine, and through the electric conductive annular brush device (107) for being connected in parallel with the power end of the drive control device (103); moreover, capable of being connected in parallel with the output end after being controlled by the drive control device (103), thereby enabling the polarity, the excitation voltage and current to be individually controlled by the drive control device (103), wherein the excitation polarity thereof and the magnetic pole of the rotary part include the auxiliary excitation with same polarity or the differential excitation with different polarities.

4. A switch type DC brushless electric machine having an auxiliary excitation winding set as claimed in claim 1, wherein the electric circuit layout of the switched DC brushless electric machine (1000) is installed with the serial type auxiliary excitation winding set (105) and the parallel type auxiliary excitation winding set (108) as follows:

the serial type auxiliary excitation winding set (105) is wound on the magnetic pole of the rotary part (104) of the electric machine, through the electric conductive annular brush device (107) for being connected in series with the electric power input end of the drive control device (103) having its output end served to drive and control the magnetic field winding set (102) of the electric machine then leaded to the DC power source, wherein the excitation polarity thereof and the magnetic pole of the rotary part include the auxiliary excitation with same polarity or the differential excitation with different polarities;

the parallel type auxiliary excitation winding set (108) is wound on the magnetic pole of the rotary part of electric machine (104), and through the electric conductive annular brush device (107) for being connected in parallel with the power end of the drive control device (103); moreover, capable of being connected in parallel with the output end after being controlled by the drive control device (103), thereby enabling the polarity, the excitation voltage and current to be individually controlled by the drive control device (103), wherein the excitation polarity thereof and the magnetic pole of the rotary part include the auxiliary excitation with same polarity or the differential excitation with different polarities.

5. A switch type DC brushless electric machine having an auxiliary excitation winding set as claimed in claim 1, wherein the negative terminal of the parallel type auxiliary excitation winding set (108) and the negative terminal of the serial type auxiliary excitation winding set (105) are jointly connected thereby forming a long compound excitation connection, or the negative terminal of the parallel type auxiliary excitation winding set (108) is connected with the positive terminal of the serial type auxiliary excitation winding set (105) thereby forming a short compound excitation connection, the excitation polarity of the magnetic pole of the rotary part including the auxiliary excitation with same polarity or the differential excitation with different polarities.

\* \* \* \* \*